United States Patent
Keohane et al.

(10) Patent No.: US 7,779,470 B2
(45) Date of Patent: Aug. 17, 2010

(54) SERVER DENIAL OF SERVICE SHIELD

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 172 days.

(21) Appl. No.: 12/049,508

(22) Filed: Mar. 17, 2008

(65) Prior Publication Data
US 2008/0168556 A1    Jul. 10, 2008

Related U.S. Application Data

(63) Continuation of application No. 10/825,149, filed on Apr. 15, 2004, now Pat. No. 7,363,513.

(51) Int. Cl.
*G08B 23/00* (2006.01)
*G06F 12/14* (2006.01)

(52) U.S. Cl. ............... 726/22; 726/4; 726/5; 726/11; 726/13

(58) Field of Classification Search .............. 713/194, 713/193, 189, 188, 183
See application file for complete search history.

(56) References Cited

U.S. PATENT DOCUMENTS

| 5,081,678 | A | 1/1992 | Kaufman et al. |
| 5,253,341 | A | 10/1993 | Rozmanith et al. |
| 5,349,675 | A | 9/1994 | Fitzgerald et al. |
| 7,308,716 | B2 * | 12/2007 | Danford et al. ............... 726/23 |
| 7,372,809 | B2 * | 5/2008 | Chen et al. .................. 370/229 |
| 7,426,634 | B2 * | 9/2008 | Jain ........................... 713/151 |
| 7,669,229 | B2 * | 2/2010 | Grobman ...................... 726/2 |

* cited by examiner

*Primary Examiner*—Jung Kim
(74) *Attorney, Agent, or Firm*—Okamoto & Benedicto LLP

(57) ABSTRACT

A method, apparatus, and computer instructions for responding to a denial of service attack. The method comprising from a remote data processing system detects an occurrence of the denial of service attack in which invalid credentials are presented to the data processing system. Connections from the remote data processing system to the data processing system are blocked in response to detecting the occurrence of the denial of service attack. A command is selectively sent to a server data processing system to block connections from the remote data processing system, in response to detecting the occurrence the denial of service attack.

15 Claims, 3 Drawing Sheets

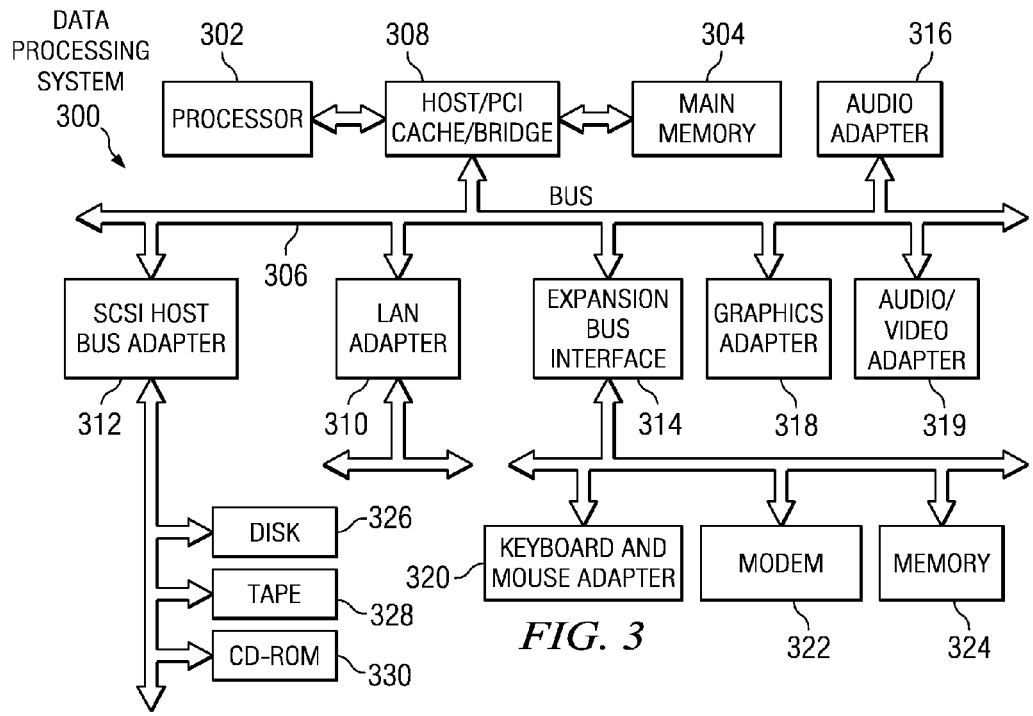
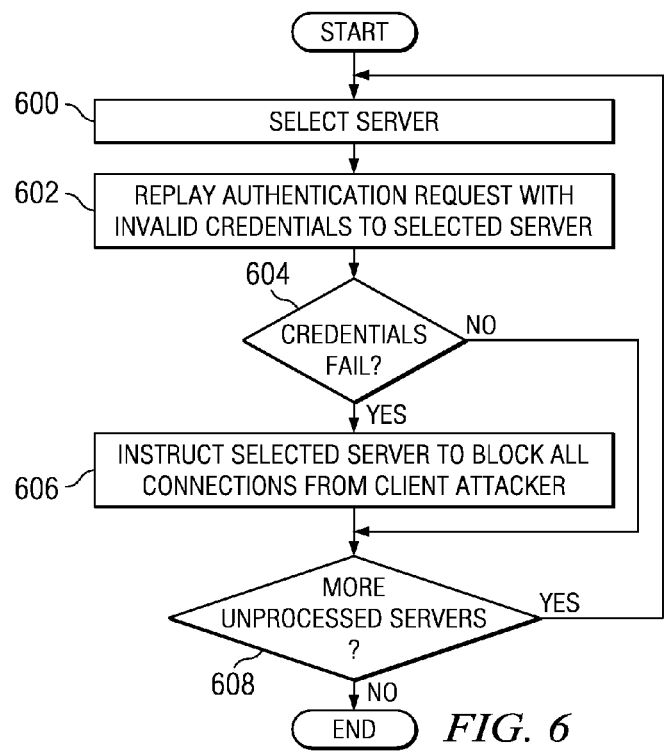

SERVER DENIAL OF SERVICE SHIELD

This application is a continuation of application Ser. No. 10/825,149, filed Apr. 15, 2004, now U.S. Pat. No. 7,363,513.

BACKGROUND OF THE INVENTION

1. Technical Field

The present invention relates generally to an improved data processing system and in particular to a method and apparatus for processing data. Still more particularly the present invention relates to a method, apparatus, and computer instructions for preventing attacks from a client data processing system.

2. Description of Related Art

The Internet is commonly employed by many users to obtain information and to buy and sell goods and services. Many users and organizations have setup Websites to provide information and to transact business. With this usage, malicious attacks and hacking of Websites has occurred. Attackers often target popular websites with large amounts of traffic. One type of attack that is used is a denial of service (DoS) attack.

This type of attack is an attack in which a user or organization is deprived of a resource or services that they would normally expect to have on the Internet. Typically, a loss of service is an inability of a particular network service, such as email, to be available or the temporary loss of all network connectivity and services. In some cases, a Website accessed by millions of users may be forced to temporarily cease operation. A denial of service attack also can destroy files in a data processing system. A denial of service attack is considered a type of security breach that does not result in the theft of information or other security loss. These types of attacks, however, may cost the targeted user or organization a great deal of time and money.

A number of different types of denial of service attacks are present. The types of attacks include, for example, buffer overflow attacks, smurf attacks, teardrop attacks, and authentication attacks. These and other types of attacks may cause resources at a Website to be consumed and prevent legitimate users from accessing the Website. Examples of limited resources include bandwidth, database connections, disk storage, processor resources, memory, thread, or application specific resources. All of these resources may be consumed or tied up by attacks that target the resources.

For example, a type of attack that consumes or ties up processor resources is a authentication denial of service attack. In this type of attack, invalid credentials may be presented to the server for a Website or to access services. When credentials are received, processor intensive cryptography processes are needed to determine that the credentials are invalid. As soon as the invalid credentials are detected, the attacker immediately resends the invalid credentials again. This resending of credentials causes the server to repeat the validation process.

Currently, a threshold or tolerance level may be selected for a server to recognize that an authentication denial of service attack is occurring. The threshold may be set for some number of invalid presentations of credentials from a particular client. When such an attack is recognized, the server denies all connection attempts from this malicious client. This client, recognizing that it cannot connect to the server, redirects the attack to another server. The second server goes through the same process as the original server using processor resources to process credentials from the attacking client until a threshold is reached and the second server denies further connections from that client. Although the connections may be denied after the threshold is reached, processor resources are consumed before reaching the threshold. Further, these attacks usually involve large numbers of attacking clients, targeting the server.

Therefore, it would be advantageous to have an improved method, apparatus, and computer instructions for recognizing and preventing authentication denial of service attacks.

SUMMARY OF THE INVENTION

The present invention provides a method, apparatus, and computer instructions for responding to a denial of service attack. The method comprising from a remote data processing system detects an occurrence of the denial of service attack in which invalid credentials are presented to the data processing system. Connections from the remote data processing system to the data processing system are blocked in response to detecting the occurrence of the denial of service attack. A command is selectively sent to a server data processing system to block connections from the remote data processing system, in response to detecting the occurrence the denial of service attack.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 6 is a flowchart of a process for blocking denial of service attacks from a client in accordance with a preferred embodiment of the present invention.

DETAILED DESCRIPTION OF THE PREFERRED EMBODIMENT

Figure 1:
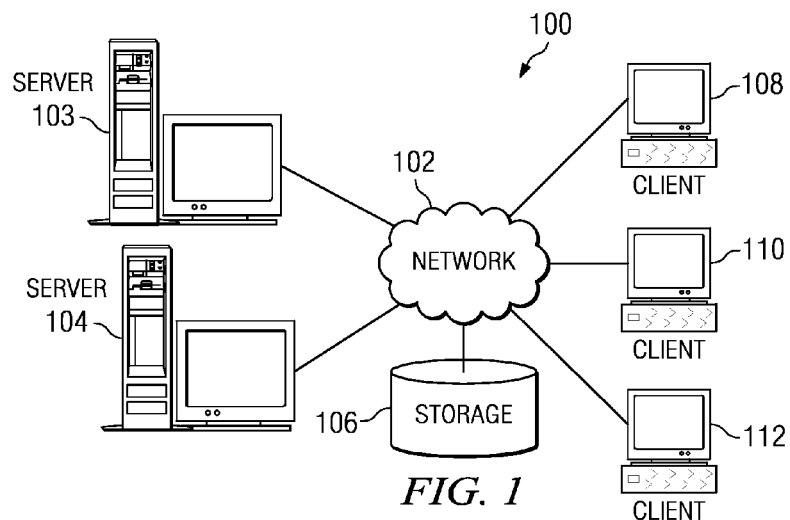
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 103 and 104 are connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. One or more of these clients may be a malicious client that initiates an authentication denial of service attack in which invalid credentials are presented to server 104 for processing in an attempt to use up or consume processor resources.

When server 104 recognizes that a denial of service attack has occurred, the server denies all connection attempts from the attacking client. Additionally, server 104 shares the denial of service attack with server 103 in accordance with a preferred embodiment of the present invention. This feature allows server 103 to circumvent the denial of service attack and immediately block the attack client or clients.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
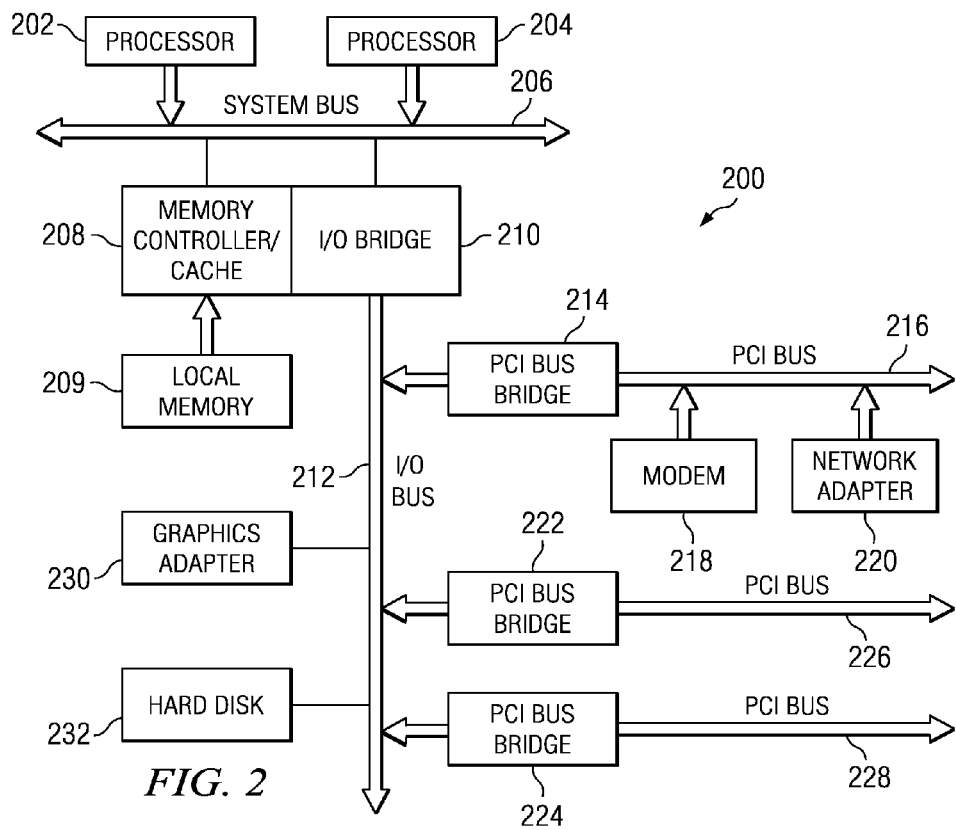
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Server data processing system 200 is an example of a server in which the mechanisms of the present invention may be implemented to prevent a denial of service attack involving invalid credentials.

Server data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for responding to a denial of service attack. The mechanism of the present invention essentially generates a denial of service shield when a denial of service attack involving the presentation of invalid credentials is detected. When such an attack is detected by a first server, connections from the client presenting the invalid credentials are blocked or denied. In these illustrative examples, the terms block and deny mean the same thing. The data packets from the client are not allowed to enter or come into the data processing system. Additionally, an instance of one of the denial of service attacks is replayed by the first server to a second server. If the instance replayed to that second server fails, a command is sent to the second server to block connections from the client.

By replaying an instance of the attack, the mechanism avoids a false denial of access by the client to the second server. For example, the client may have access to the second server, but not to the first server with an honest mistake being made in attempt to authenticate with the first server.

Figure 4:
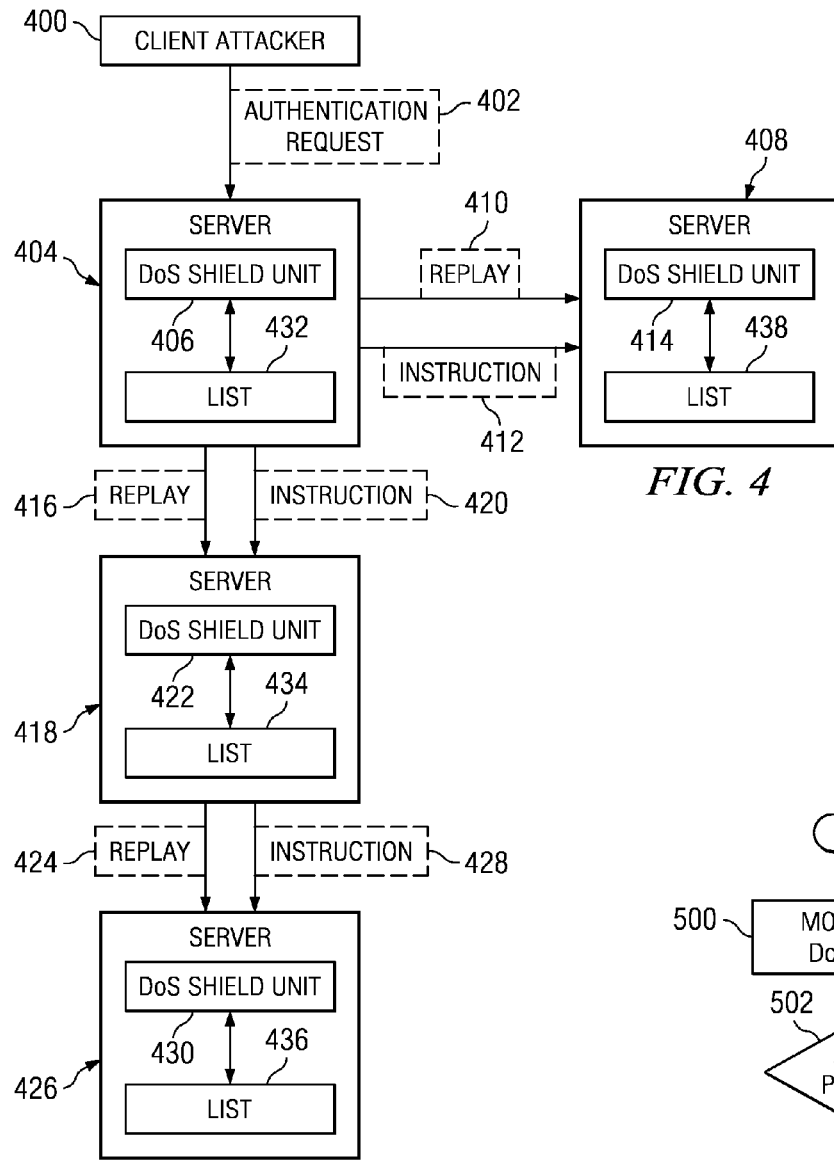
FIG. 4 is a diagram illustrating components used in responding to a denial of service attack in accordance with a preferred embodiment of the present invention.

Turning now to FIG. 4, a diagram illustrating components used in responding to a denial of service attack is depicted in accordance with a preferred embodiment of the present invention. In this illustrative example, client attacker 400 sends authentication request 402 to server 404. This server and other servers in FIG. 4 may be implemented using server data processing system 200 in FIG. 2. The servers illustrated in FIG. 4 may be, for example, a group of servers used to provide services for a website.

Authentication request 402 includes invalid credentials. This request is sent after client attacker 400 establishes a connection with server 404. These credentials are authenticated by server 404 using a processor intensive process, such as a cryptography process. Since the credentials in authentication request 402 are invalid, server 404 rejects the credentials. Client attacker 400 continues to send invalid credentials until server 404 recognizes that a denial of service attack is in process. The process for recognizing a denial of service attack may be implemented in DoS shield unit 406. The requests from client attacker 400 may be identified as being a denial of service attack when some tolerance level or threshold is met. For example, if the client attacker sends invalid credentials more than some selected number of times, then DoS shield unit 406 identifies these connection requests as being part of a denial of service attack. An example of a threshold level is three unsuccessful authentication attempts. Another way to detect a denial of service attack is if client attacker 400 skips the authentication process and directly requests a service from server 404. Server 404 looks up client attacker 400 and finds that this client is not authenticated. At that time, server 404 may deny access to the service and identify the request to be part of a denial of service attack.

At that time, DoS shield unit 406 denies or blocks additional connection attempts from client attacker 400. In these illustrative examples, client attacker 400 is identified using the IP request, identifying the source of the request, in authentication request 402.

In accordance a preferred embodiment of the present invention, DoS shield unit 406 may cause server 408 to block connection requests from client attacker 400 without requiring sever 408 to process server requests from client attacker 400 until a threshold level is reached. In particular, replay 410 is sent to server 408. Replay 410 is an instance of a denial of service attack made by client attacker 400. Specifically, replay 410 is a authentication request made by client attacker 400, such as authentication request 402. If the connection request in replay 410 is denied by server 408, DoS shield unit 406 sends instruction 412 to DoS shield unit 414. This instruction causes server 408 to automatically refuse connection requests from client attacker 400. In this case, the server actually refuses allowing the client to even establish a connection that is required to make authentication requests. In other words, automatically refusing connection requests, connection requests from client attacker 400 are refused without processing credentials contained in those requests. This instruction includes the IP address of client attacker 400 for use in identifying requests to be refused.

If the connection request in replay 410 is accepted by server 408, then instruction 412 is not sent to server 408. This replaying of an instance of an attack identified by server 404 prevents the false blocking or denial of requests by client attacker 400. Client attacker 400 may have access to server 408, but not to server 404. The connection requests to server 404 may have been mistakenly made when those requests should have been made to server 408. This feature avoids a false denial of access to server 408 by client attacker 400.

Server 404 also may send replay 416 to server 418. Similarly, if the connection request in replay 416 is rejected by server 418, instruction 420 is sent to DoS shield unit 422 to cause server 418 to block connection requests from client attacker 400. In addition, server 418 may send replay 424 to server 426 followed by instruction 428 if the connection request is denied. In this manner, DoS shield unit 430 will cause server 426 to deny connection requests from client attacker 400.

The illustrative example in FIG. 4 demonstrates the creation of a denial of service shield for groups of servers, servers 404, 408, 418, and 426. In particular servers to which replays and instructions are sent may be identified through a list of servers. For example, DoS shield 406 identifies server 408 and server 416 from list 432. Server 418 knows to send replay 424 and instruction 428 to server 426 using list 434 in these illustrative examples. Server 426 does not contact another server because list 436 points back to server 418. List 438 points to server 404. Alternatively, each server may include a list of all servers that are to be protected.

Another mechanism to identify client attacker 400 is the use of a distribution list. Instruction 428 may contain an instruction indicating that servers 404, 408, and 418 already have the instruction to deny access. In this manner, server 426 may know which other servers have seen the instruction identifying that a denial of service attack has occurred. In this manner, the mechanisms of the present invention primitively blocks connection requests from attacking clients before they can start attacks on servers, once one server detects the attack.

Figure 5:
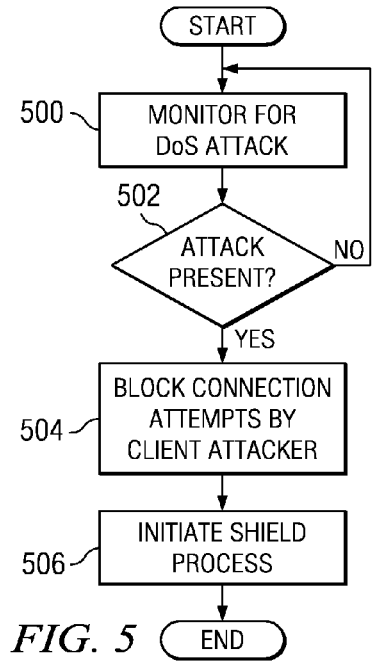
FIG. 5 is a flowchart of a process for detecting and responding to a denial of service attack using invalid credentials in accordance with a preferred embodiment of the present invention.

With reference now to FIG. 5, a flowchart of a process for detecting and responding to a denial of service attack using invalid credentials is depicted in accordance with a preferred embodiment of the present invention. The process illustrated in FIG. 5 may be implemented in a denial of service shield unit, such as DoS shield unit 406 in FIG. 4.

The process begins by monitoring for a denial of service (DoS) attack (step 500). Next, a determination is made as to whether an attack is present (step 502). The monitoring of determination involves receiving authentication requests from a client more than some number of times within a selected period of time in these illustrative examples.

If an attack is present, connection attempts by the client attacker are blocked (step 504). The client attacker is identified by the IP address in the authentication attempts and further connection requests from this address are automatically denied without processing credentials. Next, a shield process is initiated (step 506) with the process terminating thereafter. This shield process involves selectively causing other servers to block connection requests from the client attacker without using processor resources to process the credentials in the request. This step is described in more detail in FIG. 6 below.

Referring back to step 502, if the attack is not present, then the process returns to step 500 as described above.

With reference now to FIG. 6, a flowchart of a process for blocking denial of service attacks from a client is depicted in accordance with a preferred embodiment of the present invention. The process illustrated in FIG. 6 may be implemented in a denial of service shield unit, such as DoS shield unit 406 in FIG. 4. The flowchart in FIG. 6 is a more detailed description of step 506 in FIG. 5.

The process begins by selecting a server (step 600). In these illustrative examples, a server is identified from a list of servers. This list may be selected by an administrator and includes one or more servers that are associated with each other. Next, an instance of a authentication request containing invalid credentials are replayed to a selected server (step 602).

This instance is one connection request in a set of connection requests made by an attacking client identified as making a denial of service attack. This authentication request is a copy of a authentication request received by the server, including the same header and credential information. The same header is used in these examples, except that the server may place its own IP address in the packet, rather than that of the attacking client, for the source address. In this manner, the server being tested will respond to the server originating the replay of the attack, rather that the attacking client.

Next, a determination is made as to whether credentials fail to be accepted (step 604). Step 604 involves the selected server processing the credentials using processor resources to determine whether the credentials will be accepted. The determination in step 604 is based on the response returned by the selected server. It is possible that the credentials that are invalid for the server, on which the process of FIG. 6 is located, may be valid for the selected server. If the credentials fail, then the selected server is instructed to block all connections from a client attacker (step 606). Next, a determination is made as to whether there are more unprocessed servers are present on the list (step 608). If more unprocessed servers are not present, then the process terminates.

Referring back to step 604, if the credentials do not fail, the process proceeds to step 608 as described above. In step 608, if additional unprocessed servers are present, then the process proceeds to step 600 as described above.

Thus, the present invention provides an improved method, apparatus, and computer instructions for responding to denial of service attacks. The mechanisms of the present invention allow for a shield to be raised for a set of servers when a denial of service attack is detected at one of those servers. Detection of a denial of service attack on a first server causes that server to selectively instruct other servers to deny or block connections from the attacking data processing system.

The selective denial or blocking feature in these illustrative examples is based on replaying the credentials received by the first server from the attacking data processing system to a second server. If those credentials are rejected or fail, then that second server is instructed to block or deny connections from the attacking data processing system. In this manner, a data processing system, which is allowed access to the second server, is not falsely denied access to that server based on a mistake in attempting to connect to the first server.

As a result, the mechanism of the present invention allows for quicker responses to denial of service attacks based on false credentials than currently available. The mechanism of the present invention allows for preemptively blocking or denying connections from an attacking data processing system before that data processing system can attack other servers.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system in a first server data processing system for responding to a denial of service attack from a client, the data processing system comprising:

detecting means for detecting an occurrence of the denial of service attack from the client in which credentials are presented to the first server data processing system by the client, wherein the denial of service attack comprises sending invalid credentials to a server to consume resources of the server;

blocking means, responsive to detecting the occurrence of the denial of service attack, for blocking connections from the client to the first server data processing system;

replaying means, responsive to detecting the occurrence of the denial of service attack, for replaying an instance of the denial of service attack to a second server data processing system; and sending means, responsive to a failure of the instance of the denial of service attack on the second server data processing system, for sending a command to the second server data processing system to block connections from the client.

2. The data processing system of claim 1, wherein the replaying means comprises:

presenting means for presenting the credentials to the second server data processing system.

3. The data processing system of claim 2, wherein the failure of the instance occurs if the second server data processing system fails to accept the credentials.

4. The data processing system of claim 1 further comprising:

repeating means for repeating initiation of the replaying means and the sending means for a set of server data processing systems.

5. The data processing system of claim 1, wherein the detecting means comprises:

receiving means for receiving the credentials from the client;

first determining means for determining whether the credentials are valid; and second determining means, responsive to the credentials being invalid credentials, for determining whether the denial of service attack from the client is occurring in response to receiving the invalid credentials.

6. The data processing system of claim 5, wherein the second determining means includes:

means for determining whether a number of the invalid credentials received from the client has exceeded a threshold selected to trigger a presence of the denial of service attack.

7. The data processing system of claim 1, wherein the blocking means is a first blocking means and further comprising:

second blocking means, responsive to receiving the command from another server data processing system, for blocking connections from the client.

8. A computer program product stored in a computer recordable-type medium in a first server data processing system for responding to a denial of service attack from a client, the computer program product comprising:
- first instructions for detecting an occurrence of the denial of service attack from the client in which credentials are presented to the first server data processing system by the client, wherein the denial of service attack comprises sending invalid credentials to a server to consume resources of the server;
- second instructions, responsive to detecting the occurrence of the denial of service attack, for blocking connections from the client to the first server data processing system;
- third instructions, responsive to detecting the occurrence of the denial of service attack, for replaying an instance of the denial of service attack to a second server data processing system; and
- fourth instructions, responsive to a failure of the instance of the denial of service attack on the second server data processing system, for sending a command to the second server data processing system to block connections from the client.

9. The computer program product of claim 8, wherein the third instructions comprises:
- sub-instructions for presenting the credentials to the second server data processing system.

10. The computer program product of claim 9, wherein the failure of the instance occurs if the second server data processing system fails to accept the credentials.

11. The computer program product of claim 8 further comprising:
- sub-instructions for repeating initiation of the third instructions and the fourth instructions for a set of server data processing systems.

12. The computer program product of claim 8, wherein the second instructions comprises:
- first sub-instructions for receiving the credentials from the client;
- second sub-instructions for determining whether the credentials are valid; and
- third sub-instructions, responsive to the credentials being invalid credentials, for determining whether the denial of service attack from the client is occurring in response to receiving the invalid credentials.

13. The computer program product of claim 12, wherein the third sub-instructions includes:
- instructions for determining whether a number of the invalid credentials received from the client has exceeded a threshold selected to trigger a presence of the denial of service attack.

14. The computer program product of claim 8 further comprising:
- fifth instructions, responsive to receiving the command from another server data processing system, for blocking connections from the client.

15. A data processing system comprising:
- a bus system;
- a memory connected to the bus system, wherein the memory includes a set of instructions; and
- a processing unit connected to the bus system, wherein the processing unit executes a set of instructions to detect an occurrence of a denial of service attack from a client in which credentials are presented to a first server data processing system by the client, wherein the denial of service attack comprises sending invalid credentials to a server to consumer resources of the server; block connections from the client to the first server data processing system, in response to detecting the occurrence of the denial of service attack; replay an instance of the denial of service attack to a second server data processing system, in response to detecting the occurrence of the denial of service attack; and send a command to the second server data processing system to block connections from the client, in response to a failure of the instance of the denial of service attack on the second server data processing system.

* * * * *